Dec. 2, 1958  V. A. MISEK ET AL  2,863,124
ELECTROMAGNETIC MODULATOR
Filed Oct. 20, 1954
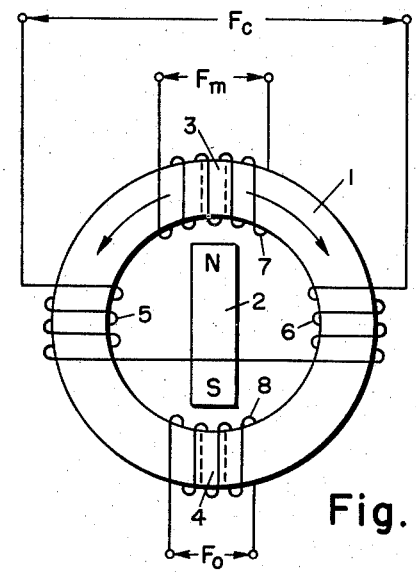
Fig. 1
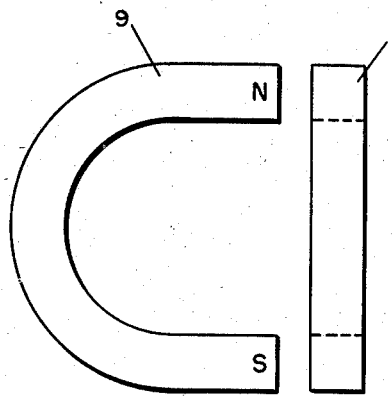
Fig. 2
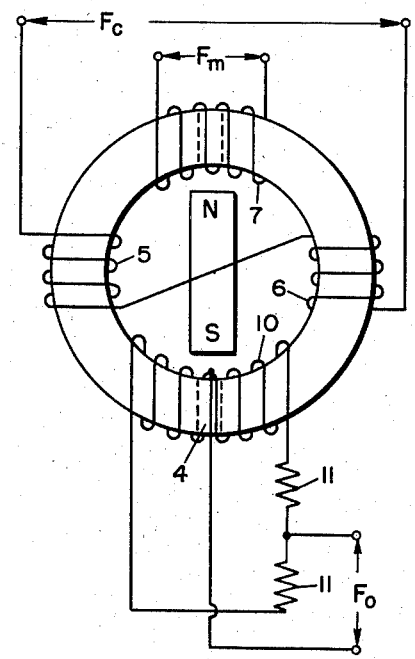
Fig. 3
Victor A. Misek
Kenneth Dollinger
INVENTORS
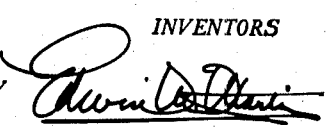
BY
Attorney

United States Patent Office 2,863,124
Patented Dec. 2, 1958

2,863,124

ELECTROMAGNETIC MODULATOR

Victor A. Misek, Nashua, and Kenneth Dollinger, Derry, N. H., assignors, by mesne assignments, to Sanders Associates, Inc., Nashua, N. H., a corporation of Delaware Application October 20, 1954, Serial No. 463,412

6 Claims. (Cl. 332—51)

This invention relates to electromagnetic devices. More particularly, the present invention relates to electromagnetic modulators such as are used to produce suppressed carrier modulation.

Many devices have been proposed in the prior art for developing amplitude modulated carrier waves as, for example, are employed in radio-telephony. Since the information to be transmitted is carried by the sidebands, the efficiency of transmission is relatively low in systems of the prior art, in that the power of one of the sidebands at 100 percent modulation is only 25 percent of the power of a carrier which carries no information.

Recently there has been used a device, known in the art as a "balanced modulator," wherein only the sideband frequencies, carrying the information, appear in the output and the original carrier is eliminated. The use of balanced modulators in this manner is commonly referred to as "suppressed carrier modulation." These devices ordinarily are characterized by frequency instabilities, which are occasioned by the effects of temperature and humidity variations on the device. Furthermore, such devices are relatively fragile, expensive and complex, particularly when used for high powered transmission. In copending application of Victor A. Misek, Serial No. 437,501, filed June 17, 1954, there is described and claimed an electromagnetic modulator device that overcomes these disadvantages. This application is directed toward an improvement on that device.

It is therefore an object of the present invention to provide an improved electromagnetic modulator which inherently provides suppressed carrier modulation.

A still further object of the present invention is to provide an improved electromagnetic modulator which is economical in its construction and inherently stable in its operation.

Other and further objects of the invention will be apparent from the following description of preferred embodiments thereof, taken in connection with the accompanying drawings.

In accordance with the invention there is provided a magnetic modulator having an annular core of magnetic material. Magnetizing means are fixedly positioned in close physical but spaced relation to the core. The magnetizing means has a pair of magnetic poles for inducing in the core a pair of parallel and opposing flux-paths for developing a flux null in the vicinity of each of the poles. A modulation-signal winding is placed on the core in the vicinity of one of the poles for applying a modulation-signal for varying the relative flux strengths in the paths to oscillate the flux nulls. An output winding is provided on the core in the vicinity of the other of the poles. The output winding is responsive to variations of the flux strengths and, particularly, to the motion of the flux null at the other pole, resulting from the variations. A carrier-signal winding is provided on the core intermediate the modulation-signal and output windings for applying a carrier-signal to vary the flux strengths further. The variations of flux strengths thus produced cause the flux nulls to oscillate at frequencies which are the algebraic sum of the modulation and carrier-wave signals resulting in the developing of modulation sidebands of the carrier-wave signal in the output winding.

In the accompanying drawings:

Fig. 1 is a plan view, partially schematic, of a preferred embodiment of the present invention;

Fig. 2 is a side, elevational view illustrating a modification of the embodiment in Fig. 1; and Fig. 3 is a plan view of another embodiment of the invention.

Referring now to the drawings and with particular reference to Fig. 1, an annular ferro-magnetic core 1 has opposing unidirectional magnetic fields applied in each half thereof by a permanent magnet 2, disposed adjacent the core along an inside diameter thereof, as shown. The term "ferro-magnetic" as used herein includes all materials having a magnetic permeability of greater than one. The permanent magnet provides a magnetizing means fixedly positioned in close physical but spaced relation to the core 1 and having a pair of magnetic poles for inducing in the core a pair of parallel and opposing flux paths for developing a flux null in the vicinity of each of the poles. Assuming the core 1 to have a substantially homogeneous permeability, null regions as indicated at 3 and 4 are located where the opposing magnetic fields meet and cancel each other out. As defined above, the regions 3 and 4 are substantially diametrically opposed. A carrier-wave signal $F_c$, having a frequency for example of 4 megacycles, is applied to the windings 5 and 6 which are connected in series opposition. Since the alternating fields produced by these windings are in opposition within the core, the null regions remain stationary. An output winding 8 is symmetrically disposed about the null region 4 and under these circumstances produces no output.

Introduction of a magnetic field in the vicinity of the region tends to increase the strength of the field on one side of the core and decreases the strength of the field on the other side of the core, to effect a shift in the positions of the null regions 3 and 4.

A modulation winding 7 surrounding the core in the vicinity of the null region 3 is connected to a source of modulation-signal $F_m$ having a frequency, for example, of 10,000 cycles. The null regions 3 and 4 are thereby caused to oscillate about their zero positions at the modulation frequency. The variation of the opposing fields which causes the oscillatory motion of the null region induces an output alternating voltage $F_o$ in the winding 8. If the modulation voltage is so chosen that the excursion of the null region does not exceed the extremities of the winding 8, the output voltage $F_o$ will be a function of the null positions. Thus, the device as shown suppresses the original carrier frequency $F_c$. The device produces, in its output, voltages, having the original modulation frequency $F_m$, the sum of the carrier and modulation frequencies $F_c+F_m$ and the difference between the carrier and modulation frequencies $F_c-F_m$.

Since the difference between the original modulating frequency and a sideband frequency is so great, the undesired frequencies may readily be filtered out. If, for example, the modulation frequency of 10,000 cycles is to be eliminated, a simple high-pass filter as used in the grid circuit of a resistance coupled amplifier will naturally severely attenuate the low frequency component. Conversely, an LC low-pass filter may be used to attenuate the sideband frequencies.

In Fig. 2 a modification of the embodiment of the invention shown in Fig. 1 is illustrated. Here a horseshoe permanent magnet 9 is used in place of the bar magnet 2, adjacent the core 1, as shown.

A device such as is illustrated in Fig. 1, modified as shown in Fig. 2, has been constructed and tested. This model employed a ferrite core ¼ of an inch square in cross-section and having an outer diameter of 1 and ⅞ inches. It was manufactured under the trade name of Ferramic I-141 by General Ceramics and Steatite Corporation. The windings 5, 6 and 8 were each composed of four turns of #20 insulated copper wiring. The winding 7 was composed of 100 turns of #26 insulated copper wiring. An Alnico magnet having a residual magnetism of 7500 gauss was used to supply the unidirectional magnetic field.

Where inherent suppression of both the carrier and modulation frequencies is desired, complete balancing is required in the output. In the embodiment of Fig. 3, the windings 5 and 6 are connected series aiding to shift the null regions at the carrier frequency $F_c$. A different output winding 10 is disposed symmetrically about the null region 4 and is connected in push-pull relation to a pair of load resistors 11, as shown. Here the output voltage $F_o$ consists only of the sideband frequencies $F_c+F_m$ and $F_c-F_m$.

While there has been hereinbefore described what are at present considered preferred embodiments of the invention, it will be apparent that many and various changes and modifications may be made with respect to the embodiment illustrated, without departing from the spirit of the invention. It will be understood, therefore, that all those changes and modifications as fall fairly within the scope of the present invention, as defined in the appended claims, are to be considered as a part of the present invention.

What is claimed is:

1. A magnetic modulator comprising: an annular core of magnetic material; magnetizing means fixedly positioned in close physical but spaced relation to said core and having a pair of magnetic poles for inducing in said core a pair of parallel and opposing flux paths for developing a flux null in the vicinity of each of said poles; a modulation-signal winding on said core in the vicinity of one of said poles for applying a modulation-signal for varying the relative flux strengths in said paths to oscillate said flux nulls; an output winding on said core in the vicinity of the other of said poles and responsive to said variations of said flux strengths and, particularly to the motion of the flux null at said other of said poles resulting from said variations; and a carrier-signal winding on said core intermediate said modulation-signal and output windings for applying a carrier-wave signal to further vary said flux strengths, whereby the variations of flux strengths cause said flux nulls to oscillate at frequencies which are the algebraic sum of the modulation and carrier-wave signals resulting in the developing of modulation sidebands of said carrier-wave signal in said output winding.

2. A magnetic modulator comprising: an annular core of magnetic material; a magnet fixedly positioned in close physical but spaced relation to diametrically opposite areas of said core and having a pair of magnetic poles for inducing in said core a pair of parallel and opposing flux paths for developing a flux null in the vicinity of each of said poles; a modulation-signal winding on said core in the vicinity of one of said poles for applying a modulation signal for varying the relative flux strengths in said paths to oscillate said flux nulls; an output winding on said core in the vicinity of the other of said poles and responsive to said variations of said flux strengths and, particularly to the motion of the flux null at said other of said poles resulting from said variations; and a pair of carrier-signal windings on said core intermediate said modulation-signal and output windings for applying a carrier-wave signal to further vary said flux strengths, whereby the variations of flux strengths cause said flux nulls to oscillate at frequencies which are the algebraic sum of the modulation and carrier-wave signals resulting in the developing of modulation sidebands of said carrier-wave signal in said output winding.

3. A magnetic modulator comprising: an annular core of magnetic material; a bar magnet fixedly positioned in close physical but spaced relation across a diameter of said core and having a pair of magnetic poles for inducing in said core a pair of parallel and opposing flux paths for developing a flux null in the vicinity of each of said poles; a modulation-signal winding on said core in the vicinity of one of said poles for applying a modulation signal for varying the relative flux strengths in said paths to oscillate said flux nulls; an output winding on said core in the vicinity of the other of said poles and responsive to said variations of said flux strengths and, particularly to the motion of the flux null at said other of said poles resulting from said variations; and a pair of carrier-signal windings on said core intermediate said modulation-signal and output windings for applying a carrier-wave signal to further vary said flux strengths, whereby the variations of flux strengths cause said flux nulls to oscillate at frequencies which are the algebraic sum of the modulation and carrier-wave signals resulting in the developing of modulation sidebands of said carrier-wave signal in said output winding.

4. A magnetic modulator comprising: an annular core of magnetic material; a horseshoe magnet fixedly positioned in close physical but spaced relation to diametrically opposite areas of said core and having a pair of magnetic poles for inducing in said core a pair of parallel and opposing flux paths for developing a flux null in the vicinity of each of said poles; a modulation-signal winding on said core in the vicinity of one of said poles for applying a modulation signal for varying the relative flux strengths in said paths to oscillate said flux nulls; an output winding on said core in the vicinity of the other of said poles and responsive to said variations of said flux strengths and, particularly to the motion of the flux null at said other of said poles resulting from said variations; and a pair of carrier-signal windings on said core intermediate said modulation-signal and output windings for applying a carrier-wave signal to further vary said flux strengths, whereby the variations of flux strengths cause said flux nulls to oscillate at frequencies which are the algebraic sum of the modulation and carrier-wave signals resulting in the developing of modulation sidebands of said carrier-wave signal in said output winding.

5. A magnetic modulator comprising: an annular core of magnetic material; magnetizing means fixedly positioned in close physical but spaced relation to said core and having a pair of magnetic poles for inducing in said core a pair of parallel and opposing flux paths for developing a flux null in the vicinity of each of said poles; a modulation-signal winding on said core opposite one of said poles for applying a modulation signal for varying the relative flux strengths in said paths to oscillate said flux nulls; an output winding on said core opposite the other of said poles and responsive to said variations of said flux strengths and, particularly to the motion of the flux null at said other of said poles resulting from said variations; and a pair of carrier-signal windings at diametrically opposite section of said core intermediate said modulation-signal and output windings for applying a carrier-wave signal to further vary said flux strengths, whereby the variations of flux strengths cause said flux nulls to oscillate at frequencies which are the algebraic sum of the modulation and carrier-wave signals resulting in the developing of modulation sidebands of said carrier-wave signal in said output winding.

6. A magnetic modulator comprising: an annular core of ferromagnetic material having low reluctance to magnetic flux; a bar magnet fixedly positioned in close physical but spaced relation across a diameter of said core and having a pair of magnetic poles for inducing in said core a pair of parallel and opposing flux paths each flowing through one half of said core for developing a flux null in the vicinity of each of said poles, said spacing between said core and said magnet providing a high reluctance for said flux; a modulation-signal winding on said core opposite one of said poles for applying a modulation signal for varying the relative flux strengths in said paths to oscillate said flux nulls; an output winding on said core opposite the other of said poles and responsive to said variations of said flux strengths and, particularly to the motion of the flux null at said other of said poles resulting from said variations; and a pair of carrier-signal windings at diametrically opposite sections of said core intermediate said modulation-signal and output windings for applying a carrier-wave signal to further vary said flux strengths, whereby the variations of flux strengths cause said flux nulls to oscillate at frequencies which are the algebraic sum of the modulation and carrier-wave signals resulting in the developing of modulation sidebands of said carrier-wave signal in said output winding.

References Cited in the file of this patent

UNITED STATES PATENTS

| | | |
|---|---|---|
| 1,462,038 | Hartley | July 17, 1923 |
| 1,824,577 | Sorensen | Sept. 22, 1931 |
| 1,847,079 | Burton | Mar. 1, 1932 |
| 2,306,998 | Claesson | Dec. 29, 1942 |
| 2,380,242 | Jewell | July 10, 1945 |
| 2,418,116 | Grieg | Apr. 1, 1947 |
| 2,435,062 | Walsh | Jan. 27, 1948 |